US010141101B2

(12) United States Patent
Ogawa (10) Patent No.: US 10,141,101 B2
(45) Date of Patent: *Nov. 27, 2018

(54) TRANSFORMER AND SWITCHED-MODE POWER SUPPLY APPARATUS

(71) Applicant: TAMURA CORPORATION, Tokyo (JP)

(72) Inventor: Hiroo Ogawa, Sakado (JP)

(73) Assignee: Tamura Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,260

(22) Filed: Jul. 5, 2016

(65) Prior Publication Data

US 2018/0013350 A1 Jan. 11, 2018

(51) Int. Cl.
*H01F 27/38* (2006.01)
*H01F 3/00* (2006.01)
(Continued)

(52) U.S. Cl.
CPC ........ *H01F 27/38* (2013.01); *H02M 3/33523* (2013.01); *H01F 30/04* (2013.01);
(Continued)

(58) Field of Classification Search
CPC .... H01F 27/38; H01F 30/04; H01F 2003/005; H01F 2005/027; H02M 3/33561; H02M 3/33507
(Continued)

(56) References Cited

U.S. PATENT DOCUMENTS 6,075,431 A * 6/2000 Honma .................... H01F 38/42
336/180
6,556,117 B1 * 4/2003 Nakao ................. H01F 27/2804
336/105
(Continued)

FOREIGN PATENT DOCUMENTS

CN 201859747 U 6/2011
EP 0 216 500 A1 4/1987
(Continued)

OTHER PUBLICATIONS

Jan. 26, 2017 Extended Search Report issued in European Patent Application No. 16178165.3.
(Continued)

*Primary Examiner* — Fred E Finch, III
*Assistant Examiner* — Rafael O De Leon Domenech
(74) *Attorney, Agent, or Firm* — Oliff PLC (57) ABSTRACT

A transformer being capable of reducing cross regulation even in a case where the load is unbalanced and a switched-mode power supply apparatus using the transformer are provided. A transformer T has a core; a primary winding provided in the core; at least two secondary windings provided in the core around a winding axis which is the same as a winding axis of the primary winding; and at least two auxiliary windings provided in the core around a winding axis which is the same as the winding axis of the primary winding; respectively neighboring the secondary windings; and connected in parallel to each other. A switched-mode power supply apparatus has the transformer T; a switching element connected to the primary winding of the transformer T; and a control circuit configured to control the switching element.

7 Claims, 12 Drawing Sheets

(51) Int. Cl.
    *H01F 5/02* (2006.01)
    *H01F 30/04* (2006.01)
    *H02M 3/335* (2006.01)
(52) U.S. Cl.
    CPC .. *H01F 2003/005* (2013.01); *H01F 2005/027* (2013.01); *H02M 3/33507* (2013.01); *H02M 3/33561* (2013.01)
(58) Field of Classification Search
    USPC ....... 336/170, 171, 172, 173, 174, 180, 181, 336/182, 183, 184, 214, 215, 220, 221, 336/222
    See application file for complete search history.

(56) References Cited

U.S. PATENT DOCUMENTS

| | | | |
|---|---|---|---|
| 7,894,212 B2 | 2/2011 | Nishikawa | |
| 2004/0190312 A1* | 9/2004 | Takada | H02M 3/28 363/21.12 |
| 2008/0212341 A1 | 9/2008 | Moiseev | |
| 2012/0326829 A1 | 12/2012 | Matsuda et al. | |
| 2013/0063240 A1* | 3/2013 | Imada | H01F 5/02 336/220 |

FOREIGN PATENT DOCUMENTS

| | | | | |
|---|---|---|---|---|
| EP | 2 639 800 A1 | 9/2013 | | |
| EP | 2 787 516 A1 | 10/2014 | | |
| JP | H05-49257 A | 2/1993 | | |
| JP | H06-338424 A | 12/1994 | | |
| JP | H07-283037 A | 10/1995 | | |
| JP | 2000-124045 A | 4/2000 | | |
| JP | 2000-223324 A | 8/2000 | | |
| JP | 2000353627 A | 12/2000 | | |
| JP | 3543029 B2 | 7/2004 | | |
| JP | 2011-134744 A | 7/2011 | | |
| JP | 2014-180111 A | 9/2014 | | |
| WO | WO 2011124761 A2 * | 10/2011 | ............. | H01F 27/38 |
| WO | 2016/022966 A1 | 2/2016 | | |

OTHER PUBLICATIONS

Jan. 25, 2017 Extended Search Report issued in European Patent Application No. 16178163.8.
Mar. 27, 2017 Office Action Issued in U.S. Appl. No. 15/202,033.
Feb. 28, 2017 Office Action issued in Japanese Patent Application No. 2015-020729.
U.S. Appl. No. 15/202,033, filed Jul. 5, 2016 in the name of Ogawa.
Feb. 14, 2017 Office Action issued in Japanese Patent Application No. 2015020730.
Sep. 19, 2017 Office Action issued in Japanese Application No. 2015-020729.
Sep. 8, 2017 Office Action issued in U.S. Appl. No. 15/202,033.
Apr. 20, 2018 Office Action issued in U.S. Appl. No. 15/202,033.
Jul. 11, 2018 Office Action issued in European Patent Application No. 16 178 165.3.
Sep. 7, 2018 Office Action issued in U.S. Appl. No. 15/202,033.

* cited by examiner

TRANSFORMER AND SWITCHED-MODE POWER SUPPLY APPARATUS

BACKGROUND OF THE INVENTION

1. Field of the Invention

The present invention relates to a transformer and a switched-mode power supply apparatus using the same, particularly a configuration of the transformer.

2. Background of the Invention

In order to operate an electrical device or electrical circuit, stable DC voltage is required and a switched-mode power supply apparatus has been conventionally used for this purpose. The switched-mode power supply apparatus rectifies and smooths a voltage which is supplied by an external power source; performs switching operation due to a semiconductor switching element to input the voltage into a primary winding of the transformer; and supplies DC voltage from a secondary winding to a load through a smoothing operation performed by a smoothing circuit. Furthermore, an output voltage is monitored, and the time ratio of the semiconductor switching element is adjusted by a control circuit so that the output voltage is constantly maintained.

As the switched-mode power supply apparatus, multi-output switched-mode power supply apparatus has been conventionally known. A transformer for the above multi-output switched-mode power supply apparatus has a core, a primary winding which is provided in a core, and at least two secondary windings which are also provided in the core.

CITATION LIST

Patent Literature

[PLT 1] Japanese Publication 05-049257(A)

SUMMARY OF THE INVENTION

Problem to be Solved

In a case of the transformer in which two or more secondary windings are provided, cross regulation may occur when the load becomes unbalanced. In other words, when the current flowing through one of the secondary windings becomes changed, other remaining secondary winding(s) which is not considered to be related to the change of the load is changed, thereby rendering the output voltage unstable.

The invention has been made for solving the above problems or drawbacks, and provides a transformer being capable of reducing the cross regulation even in a case where the load is unbalanced and a switched-mode power supply apparatus using the transformer.

Solution to Solve the Problem (1) An embodiment of the transformer has a core; a primary winding provided in the core; at least two secondary windings provided in the core around a winding axis which is the same as a winding axis of the primary winding; and at least two auxiliary windings provided in the core around a winding axis which is the same as the winding axis of the primary winding. The auxiliary windings respectively neighbor the secondary windings, and are connected in parallel to each other.

The embodiment of the transformer may have the following configuration.

(2) The secondary windings may be disposed at both sides of the primary winding and closer to the primary winding than the auxiliary windings, in a winding axis direction of the primary winding.

(3) The transformer may further have a gap provided in the core at a location where the primary winding is provided. The secondary windings may be spaced apart from both sides of the primary winding as well as the gap at an equal distance in a winding axis direction of the primary winding.

(4) An embodiment of a switched-mode power supply apparatus has the transformer in accordance with the above (1); a switching element connected to the primary winding of the transformer; and a control circuit configured to control the switching element. Moreover, the transformer may have the configuration of the above (2) or (3).

Effect of the Invention

In accordance with the invention, the transformer in which the cross regulation is reduced even in a case where the load is unbalanced and the switched-mode power supply apparatus using the transformer can be obtained.

DETAILED DESCRIPTION OF THE INVENTION

With reference to the accompanying drawings, an embodiment of a transformer in accordance with the invention and a switched-mode power supply apparatus provided with the transformer will be hereinafter described. The embodiment of the transformer is firstly described and the configuration of the switched-mode power supply apparatus using the transformer is described later.

[1. First Embodiment]
[1-1. Configuration]

Figure 1:
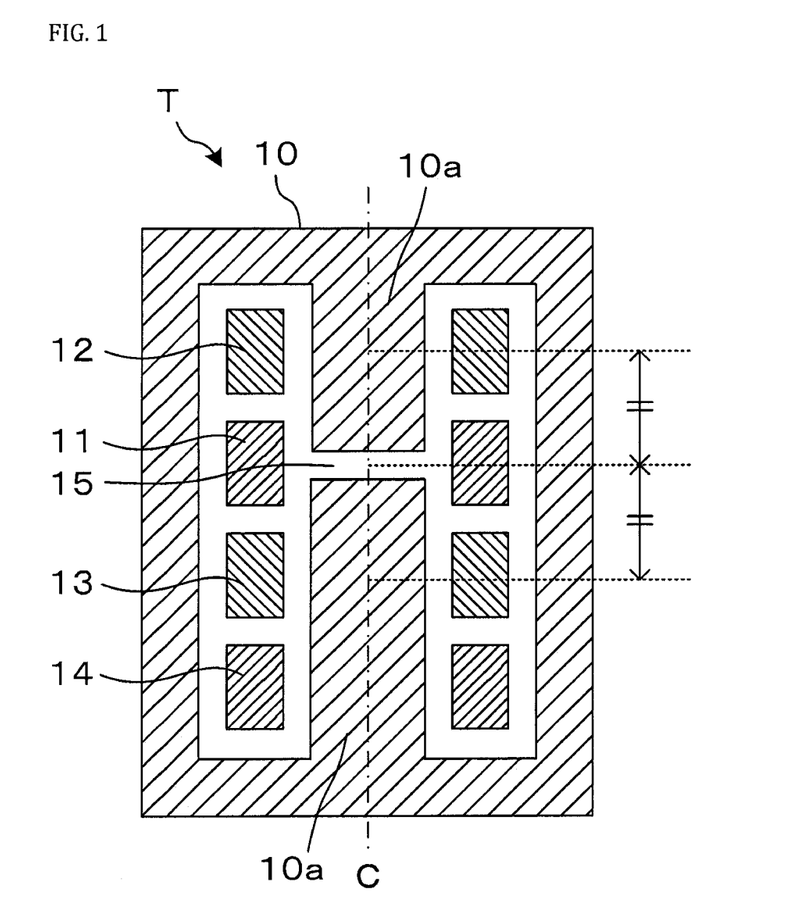
FIG. 1 is a schematic cross-sectional view showing an entire configuration of a first embodiment of a transformer.

FIG. 1 is a schematic cross-sectional view of an entire configuration of the first embodiment of a transformer in accordance with the invention. A transformer T transforms a voltage which is supplied by an external power source, and provides electric power to a load such as an external device or a circuit connected to the transformer T. Referring to FIG. 1, the transformer T has a core 10, a winding 11 provided in the core 10, at least two secondary windings 12, 13 (in the embodiment, two secondary windings), and an auxiliary winding 14.

The core 10 has a linear center leg portion 10a in the center portion thereof. The center log portion 10a is provided with the windings 11-14 such that the winding axis of the windings 11-14 is arranged on the same line C. A gap 15 is provided in the core 10 at a location where the primary winding 11 is provided. In other words, the gap 15 is provided in the center leg portion 10a. Furthermore, the secondary windings 12, 13, and the auxiliary winding 14 are wound around the center leg portion 10a in a state the polarity thereof is reversed with respect to the polarity of the primary winding 11. The core 10, the windings 11-14 are respectively insulated by a bobbin (not shown) formed of insulating material such as resin.

The primary winding 11 is connected to an external power source, and supplies electric power to the secondary windings 12, 13 and the auxiliary winding 14. The secondary windings 12, 13 are connected to the load such as the external device or the external circuit between both terminals, and supply electric power which is supplied by the primary winding 11 to the circuit or the load. The secondary windings 12, 13 are connected to, for example, a buffer circuit for operating IGBT, MOS, and the like.

The secondary windings 12, 13 are disposed at both sides of the primary winding 11 in a winding axis of the primary winding 11. In other words, both of the secondary windings 12 and 13 are disposed adjacent to the primary winding 11. Preferably, the secondary windings 12 and 13 are respectively spaced apart from the primary winding 11 at an equal distance in the winding axis of the primary winding 11. Furthermore, the secondary windings 12, 13 are respectively spaced apart from the gap 15 at an equal distance in the winding axis of the primary winding 11.

In this embodiment, the secondary windings 12, 13 are respectively spaced apart from the primary winding 11 as well as the gap 15 at an equal distance in the winding axis of the primary winding 11. In other words, the secondary windings 12, 13 are symmetrically arranged with respect to the primary winding 11, and are symmetrically arranged with respect to the gap 15.

The auxiliary winding 14 is connected to a control circuit for controlling a switching element which is described below. The auxiliary winding 14 receives electric power from the primary winding 11 to provide electric power voltage for driving the control circuit. While the auxiliary winding 14 is disposed next to the secondary winding 13 in the same winding axis as the secondary winding 13, it may be disposed next to the secondary winding 12.

Figure 2:
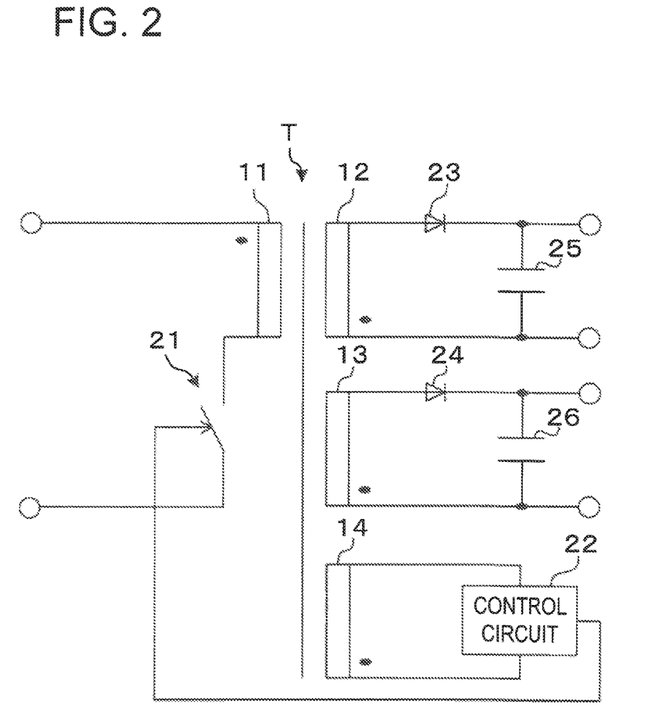
FIG. 2 is a circuit diagram of a switched-mode power supply apparatus provided with the first embodiment of the transformer.

Such a transformer T can be used in a switched-mode power supply apparatus. FIG. 2 is a circuit diagram of a switched-mode power supply apparatus provided with the first embodiment of the transformer. Since the transformer T is provided with a plurality of the secondary windings 12, 13 (in the embodiment, two secondary windings), the switched-mode power supply apparatus provided with the embodiment of the transformer (i.e., the transformer T) corresponds to a multi-output power supply apparatus. The switched-mode power supply apparatus is, for example, a flyback switched-mode power supply apparatus, and used for switching a semiconductor.

Specifically, the switched-mode power supply apparatus has the transformer T, a switching element 21, a control circuit 22 for controlling the switching element 21, diodes 23, 24, and capacitors 25, 26. The switched-mode power supply apparatus may have a rectifying/smoothing circuit. The rectifying/smoothing circuit is connected between the external power source and the primary winding 11 of the transformer T to rectify and smooth the voltage supplied by the external power source.

The switching element 21 is a semiconductor switching element such as FET. The switching element 21 is connected to the primary winding 11 of the transformer T to control the input voltage into the primary winding 11. The control circuit 22 is equipped with IC, and connected to the switching element 21 and the auxiliary winding 14 which is provided at the output side. The control circuit 22 receives the power voltage supply from the auxiliary winding 14 to control the time ratio of on/off of the switching element 21 for the purpose of controlling the input voltage into the primary winding 11. In other words, the control circuit 22 performs a control for the purpose of keeping the output voltage of the secondary windings 12 and 13 at a predetermined voltage.

For example, the control circuit 22 may have voltage monitoring means for detecting the voltage of the auxiliary winding 14, smoothing means such as a capacitor for smoothing the output voltage from the auxiliary winding 14, a photocoupler provided with a light-emitting element and a light-receiving element, and IC. In this case, as an exemplary control performed by the control circuit 22, an output voltage value from the auxiliary winding 14 which is smoothed by the smoothing means and detected by the voltage monitor means is firstly input into the IC. The IC calculates the output voltage of the secondary windings 12, 13 based on the (output) voltage value, and the winding number ratio of the auxiliary winding 14 and the secondary windings 12 and 13, and generates the control signal for stabilizing the output voltage of the secondary windings 12, 13 based on the output voltage of the secondary windings 12, 13. The IC outputs the control signal at the light-emitting element of the photocoupler which is connected to the IC. The light-emitting element converts the input control signal into optical signal, and outputs the optical signal at the light-receiving element which is connected to the switching element 21. Furthermore, the light-receiving element converts the input optical signal into electric signal, and changes the time ratio of the switching element 21 based on the electric signal.

The capacitors 25, 26 are connected to the secondary windings 12, 13. The diodes 23, 24 are connected between the secondary windings 12, 13 and the capacitors 25, 26 to rectify the output voltage from the secondary windings 12 and 13. Furthermore, the capacitors 25, 26 smooth the rectified voltage and generate DC voltage.

[1-2. Action and Effect]

Figure 3:
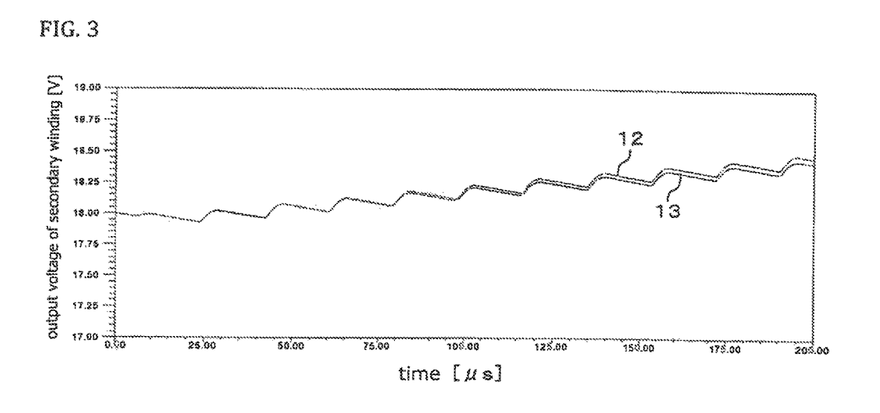
FIG. 3 is a graph showing an output voltage from each of secondary windings of the first embodiment of the transformer in the elapsed time.

(1) The embodiment of the transformer T has the core 10; the primary winding 11 and at least two secondary windings 12, 13 provided in the core 10 around the same winding axis. The gap 15 is provided in the core 10 at the location where the primary winding 11 is provided. The secondary windings 12, 13 are spaced apart from the both sides in the direction of the winding axis C and the gap 15 at an equal distance. Due to the above configuration, the inductance difference as well as the difference of coupling coefficient with respect to the primary winding 11 between the two secondary windings 12, 13 can be reduced, thereby suppressing the difference between the output voltages of the two secondary windings 12, 13 when the output voltages of the two secondary windings 12, 13 are stabilized, as shown in FIG. 3.

Figure 14:
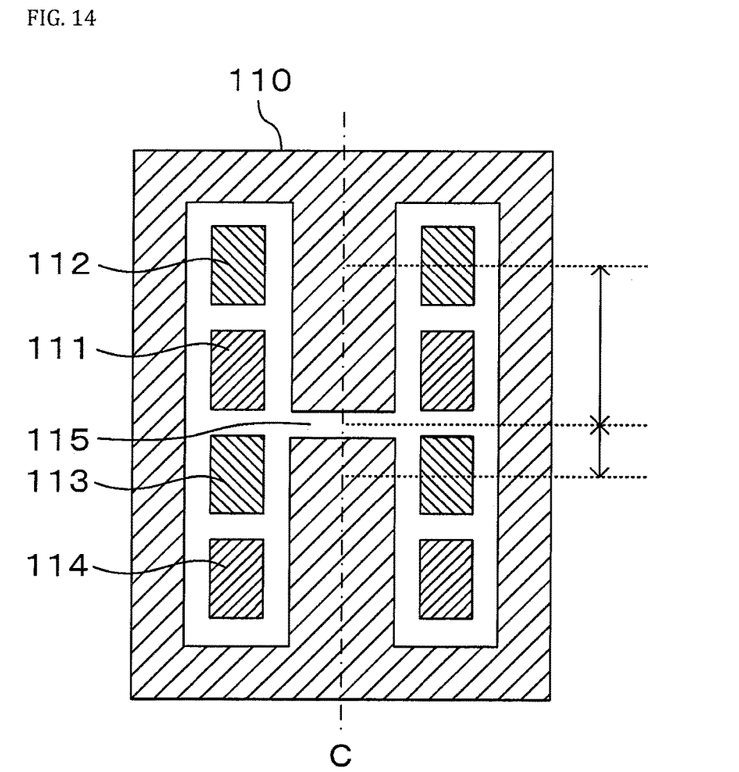
FIG. 14 is a schematic cross-sectional view showing an entire configuration of a conventional transformer.
Figure 15:
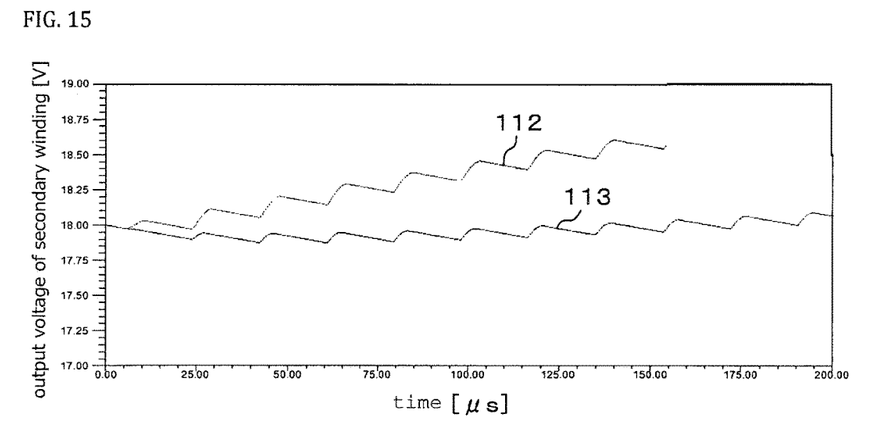
FIG. 15 is a graph showing an output voltage from each of secondary windings of the conventional transformer in the elapsed time.

More specifically, the effect of the embodiment is explained in comparison to the conventional technologies. In the conventional transformer in which the secondary windings 112, 113 that are disposed at both sides of the primary winding 111 are not spaced apart from the gap 115 at an equal distance, if the inductance values of the secondary windings 112, 113 are two-figure (digit) μH and the inductance value difference between the secondary windings 112, 113 is single-figure (digit) μH, the output voltages of the second windings differ from each other, as shown in FIG. 15. This is because the difference between the inductance values of the secondary windings 112, 113 is great. In an example as shown in FIG. 14, the inductance values are equalized to only the level of two figure (digit). To the contrary, the inductance values of the secondary windings 12 and 13 of the transformer T (i.e., the embodiment of the transformer) are equalized to the level of the first decimal place. That is, there is two-figure (digit) difference between the conventional technologies and the embodiment of the transformer in terms of the correspondence of the inductance values.

Figure 16:
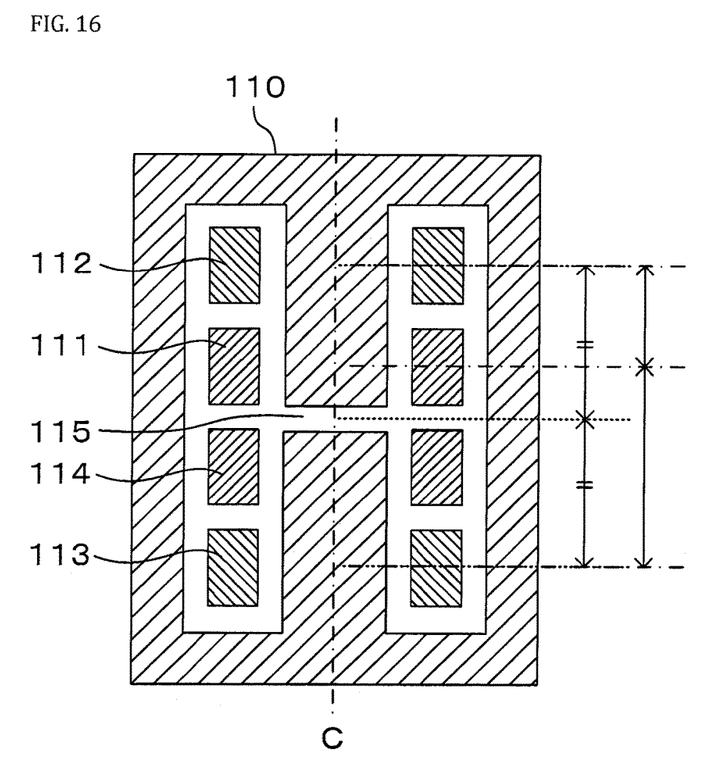
FIG. 16 is a schematic cross-sectional view showing an entire configuration of a conventional transformer.
Figure 17:
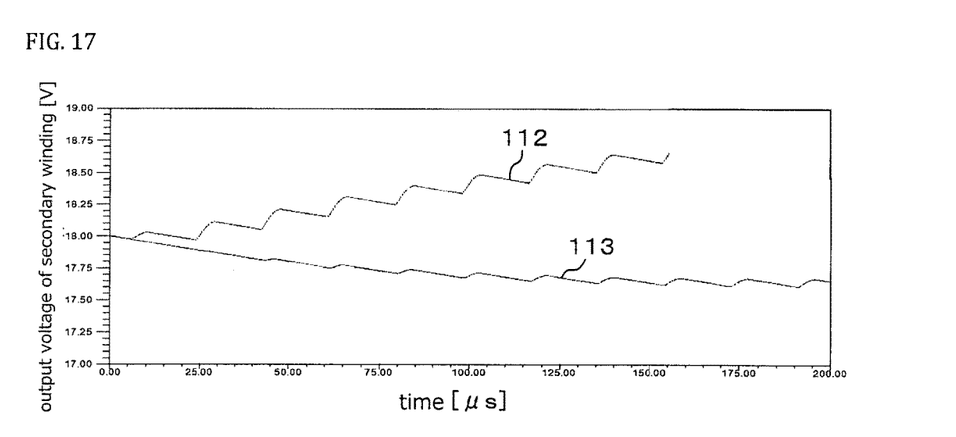
FIG. 17 is a graph showing an output voltage from each of secondary windings of the conventional transformer in the elapsed time.

Furthermore, as shown in FIG. 16, in a case of the conventional transformer in which the secondary windings 112, 113 are spaced apart from the gap 115 at an equal distance but not spaced apart from the primary winding 111 at an equal distance, if the inductance values of the secondary windings 112, 113 are two-figure μH and the inductance value difference between the secondary windings 112, 113 is the first decimal place (μH), the output voltages of the second windings 112, 113 differ from each other, as shown in FIG. 17. This is because the inductance values of the secondary windings 112, 113 are almost equal but there is a difference of the coupling with the primary winding 111 between the secondary windings 112, 113. In an example as shown in FIG. 16, the inductance values are equalized to only the level of single figure (digit). Furthermore, the coupling coefficient values of the secondary windings 112, 113 with respect to the primary winding 111 are equalized to only the level of the first decimal place. On the other hand, the inductance values of the secondary windings 12 and 13 of the transformer T (i.e., the embodiment of the transformer) are equalized to the level of the first decimal place. That is, there is single figure (digit) difference between the conventional technologies and the embodiment of the transformer in terms of the correspondence of the inductance values. Furthermore, in the transformer T (i.e., the embodiment of the transformer) the coupling coefficient values with respect to the primary winding 11 are equalized to the level of the second decimal place. That is, there is single figure (digit) difference between the conventional technologies and the transformer T (i.e., the embodiment of the transformer) in terms of the correspondence of the coupling coefficient values.

As described previously, in accordance with the embodiment, the difference of the coupling coefficient with respect to the primary winding 11 and the inductance difference between the secondary windings 12, 13 can be reduced. Therefore, the transformer being capable of synergistically suppressing the difference between the output voltages from the secondary windings 12, 13 and the switched-mode power supply apparatus using the same transformer can be obtained.

[2. Second embodiment]

[2-1. Configuration]

The second embodiment is described with reference to FIGS. 4-11. The configuration of the second embodiment is basically equal to that of the first embodiment. Therefore, only the difference between the second embodiment and the first embodiment will be described. The same part or portion is denoted by the same reference numeral, and detailed description thereof is omitted.

Figure 4:
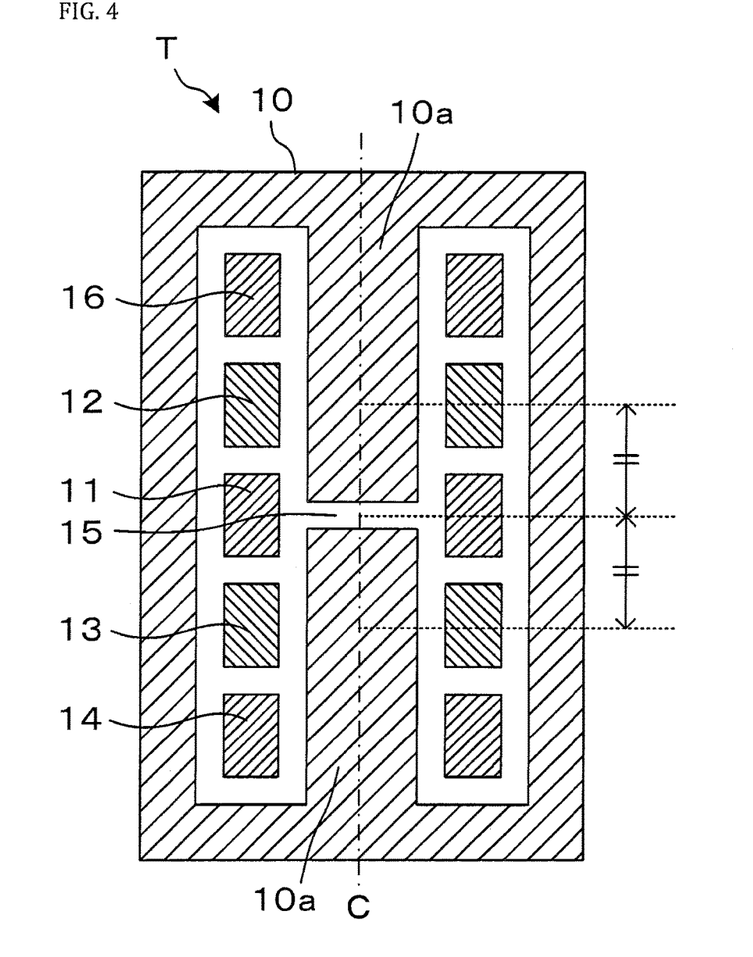
FIG. 4 is a schematic cross-sectional view showing an entire configuration of the second embodiment of a transformer.
Figure 5:
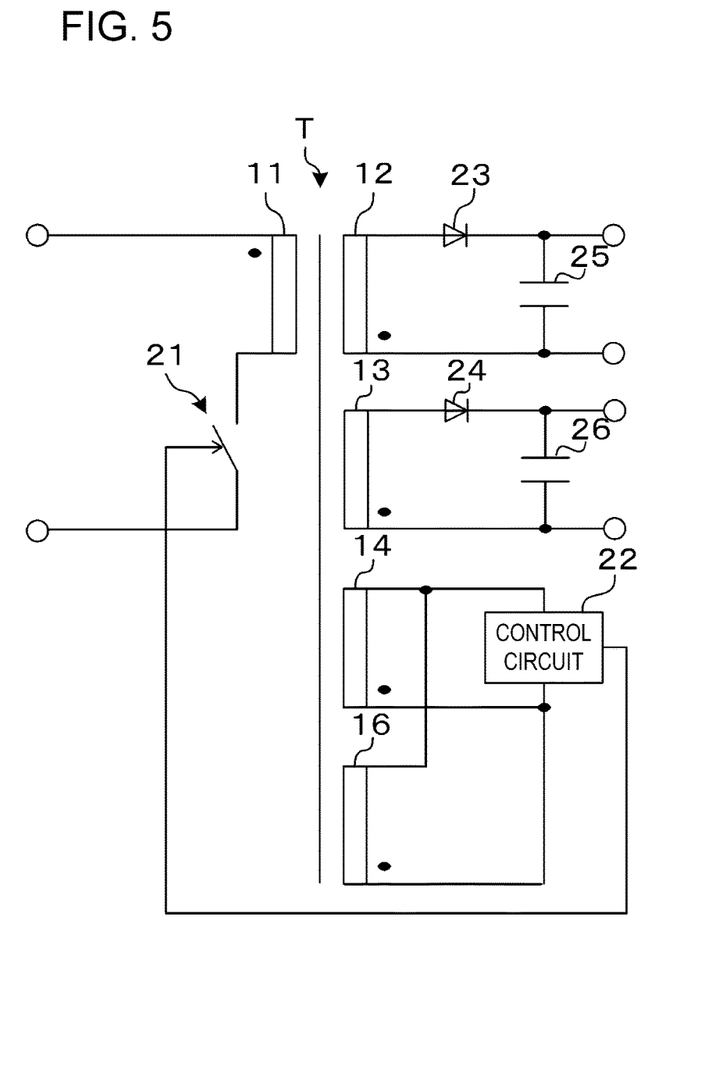
FIG. 5 is a circuit diagram of a switched-mode power supply apparatus provided with the second embodiment of the transformer.

FIG. 4 is a schematic cross-sectional view showing an entire configuration of the second embodiment of a transformer. FIG. 5 is a circuit diagram of a switched-mode power supply apparatus provided with the second embodiment of the transformer. The second embodiment is different from the first embodiment in that at least two auxiliary windings 14, 16 (two auxiliary windings in the embodiment) are provided.

In other words, the second embodiment is different from the first embodiment in that each of the auxiliary windings 14, 16 neighbors respectively each of the secondary windings 12, 13 in the winding axis direction of the windings 11-13, and connected in parallel to each other. Each of the auxiliary winding 14 and 16 is spaced apart from the gap 15 at an equal distance and arranged symmetrically with respect to the gap 15, in the winding axis direction. However, the auxiliary windings 14 and 16 may not be necessarily arranged symmetrically with respect to the gap 15.

Furthermore, in the embodiment the secondary windings 12, 13 are arranged closer to the primary winding 11 than the auxiliary windings 14, 16. Each of the windings 11-16 is insulated by the bobbin that is formed of insulating material such as resin. Furthermore, as shown in FIG. 5, the auxiliary windings 14, 16 are connected in parallel to the control circuit 22.

[2-2. Action and Effect]

(1) The action and effect of the embodiment (i.e., the second embodiment) will be explained in comparison to that of the first embodiment. In the second embodiment, even in a case where the load is unbalanced (for example, a case where two different loads are respectively connected to the secondary windings 12, 13), variation in the output voltage of the secondary windings 12, 13 can be suppressed. Furthermore, the configuration of the second embodiment can be applied to any transformer which is provided with the primary winding and two or more secondary windings.

Figure 6:
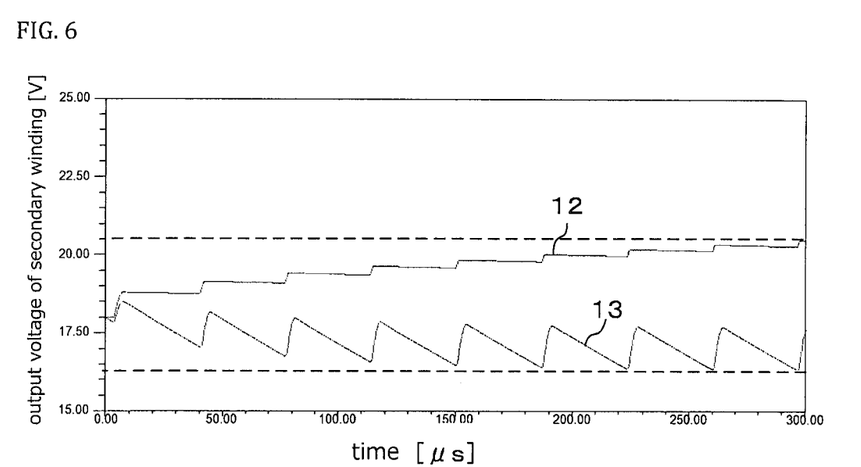
FIG. 6 is a graph showing an output voltage (after rectification) from each of secondary windings of the first embodiment of the transformer with a changed load balance in the elapsed time.

Firstly, FIG. 6 shows the waveform of the output voltage of each of the secondary windings 12, 13 in a case where the balance of the load is changed in the configuration of the first embodiment. Specifically, FIG. 6 is an example of an output voltage waveform (after rectification) in a case where the current of the secondary winding 12 is 0 A and the current of the secondary winding 13 is 0.1 A. The width between the dotted lines corresponds to the width between the maximum output voltage of the secondary winding 12 and the minimum output voltage of the secondary winding 13. It can be seen that the gap or interval is about 4.25 V.

Figure 7:
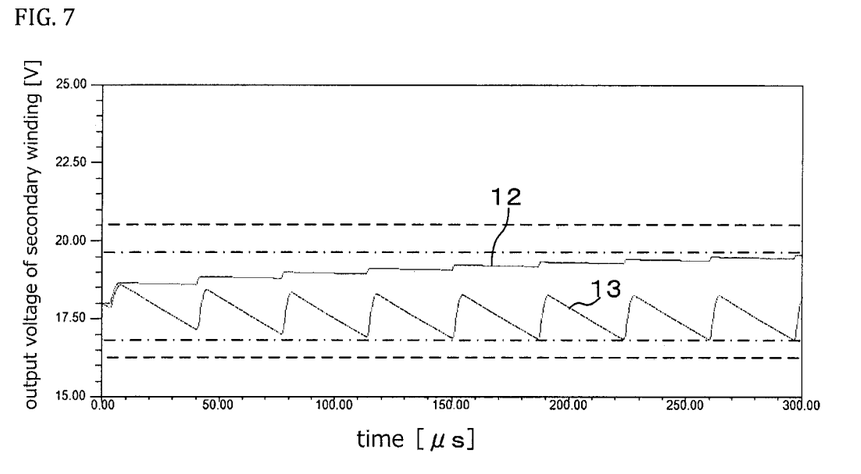
FIG. 7 is a graph showing an output voltage (after rectification) from each of secondary windings of the second embodiment of the transformer with a changed load balance in the elapsed time.

On the other hand, the embodiment of the transformer has the core 10; the primary winding 11 provided in the core 10; at least two secondary windings 12, 13 provided in the core 10 around a winding axis which is the same as a winding axis of the primary winding 11; and at least two auxiliary windings 14, 16 provided in the core 10 around a winding axis which is the same as the winding axis of the primary winding 11. In the embodiment, the auxiliary windings 14, 16 respectively neighbor the secondary windings 12, 13, and are connected in parallel to each other. Due to this configuration, even in a case where the load becomes unbalanced, the problem of the cross regulation can be improved. For example, FIG. 7 shows an output voltage waveform of the secondary windings 12, 13 (after rectification) when the balance of the load is changed. The condition of FIG. 7 is similar to that of FIG. 6 in that the current of the secondary winding 12 is 0 A and the current of the secondary winding 13 is 0.1 A. As shown in FIG. 7, the width between the dot-and-dash lines of the maximum output voltage and the minimum output voltage of the secondary windings 12, 13 is about 2.25V, which is less than the width (about 4.25V) between the dotted lines as shown in FIG. 6 and means that variation in the output voltage is less. In other words, it can be seen that the stability of the output voltage is improved, and the cross regulation is improved.

Figure 8A:
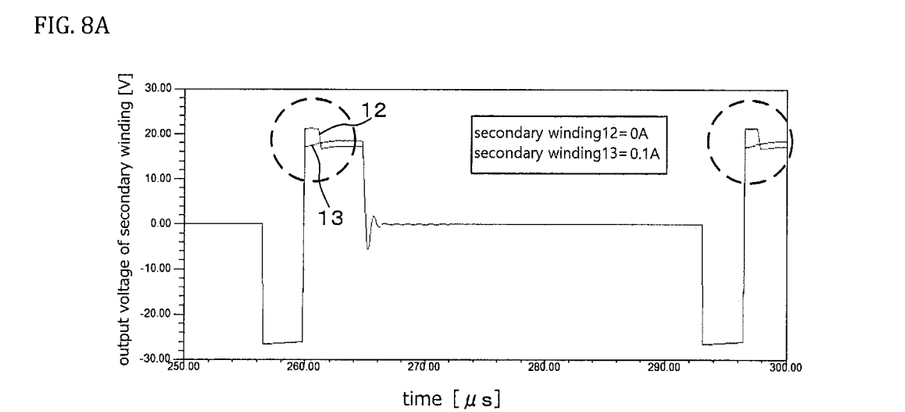
FIG. 8A shows an output voltage waveform (before rectification) of a secondary winding in a case where a current flowing through a secondary winding 12 is 0 A (i.e., no load) and a current flowing through a secondary winding 13 is 0.1 A.
Figure 8B:
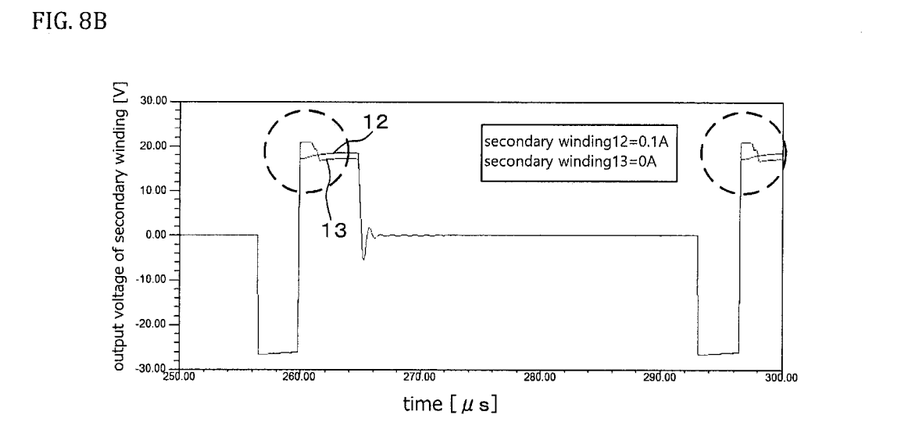
FIG. 8B shows an output voltage waveform (before rectification) of a secondary winding in a case where a current flowing through a secondary winding 12 is 0.1 A and a current flowing through a secondary winding 13 is 0 A (i.e., no load).

The reason for above phenomenon or improvement can be explained in view of the first embodiment. In the first embodiment, when the load becomes unbalanced, a distortion (i.e., a turn) is created in the output voltage waveform of the secondary winding at the no-load side. An example is shown in FIGS. 8A and 8B. FIGS. 8A and 8B show the output voltage waveform of secondary winding before rectification. FIG. 8A shows the output voltage waveform in a case where a current flowing through the secondary winding 12 is 0 A (no load) and a current flowing through the secondary winding 13 is 0.1 A. FIG. 8B shows the output voltage waveform in a case where a current flowing through the secondary winding 12 is 0.1 A and a current flowing through the secondary winding 13 is 0 A (no load). As such, the distortion in the output voltage waveform at the no-load side means corresponding or proportional variation (change) in the output voltage.

Figure 9A:
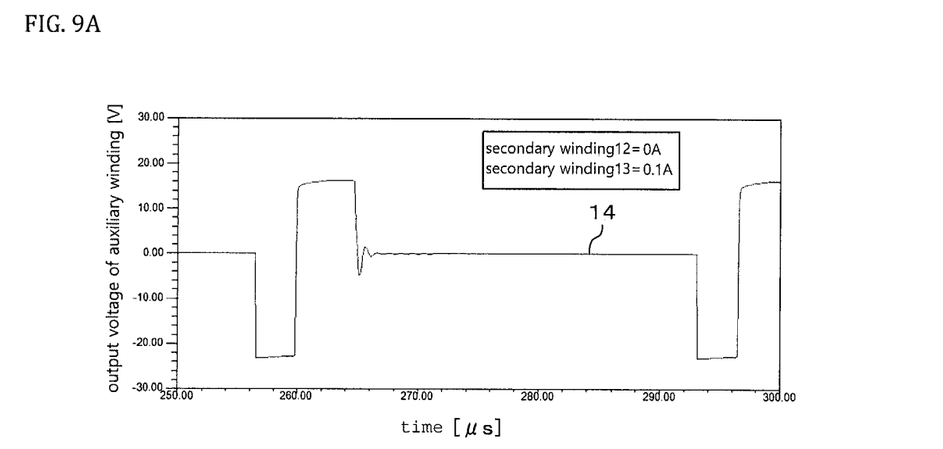
FIG. 9A is a graph showing a voltage of an auxiliary winding of the first embodiment of the transformer with a changed load balance in the elapsed time in a case where a current flowing through one of the secondary windings is 0.1 A and a current flowing through the other of the secondary windings is 0 A.
Figure 9B:
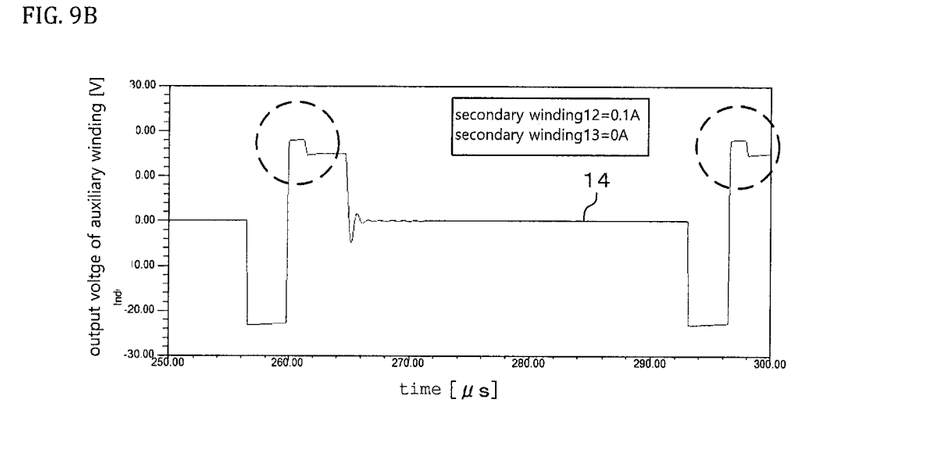
FIG. 9B is a graph showing a voltage of an auxiliary winding of the first embodiment of the transformer with a changed load balance in the elapsed time in a case where a current flowing through one of the secondary windings is 0 A and a current flowing through the other of the secondary windings is 0.1 A.

Furthermore, in a case where the distortion is created in the output voltage waveform of the secondary winding, the distortion is also created in the voltage waveform of the auxiliary winding 14 neighboring the above secondary winding. For example, the voltage waveform of the auxiliary winding 14 as shown in FIG. 9B in a case where the current flowing through the secondary winding 12 that is disposed away from the auxiliary winding 14 is 0.1 A and the current flowing through the secondary winding 13 that is disposed adjacent to the auxiliary winding 14 is 0 A is different from the voltage waveform of the auxiliary winding 14 as shown in FIG. 9A in a case where the current flowing through the secondary winding 12 that is disposed away from the auxiliary winding 14 is 0 A and the current flowing through the secondary winding 13 that is disposed adjacent to the auxiliary winding 14 is 0.1 A in the range of from 260 to 262 μs (time), and the distortion is created in FIG. 9B. Since the auxiliary winding 14 is arranged away from the secondary winding 12 and adjacent to the secondary winding 13, the coupling coefficients between the auxiliary winding 14 and each of the secondary windings 12, 13 are different from each other. For the above reasons, the ways of action through the magnetic field of the auxiliary winding 14 on each of the secondary windings 12, 13 are different, and the cross regulation is thus less likely to be improved.

Figure 10:
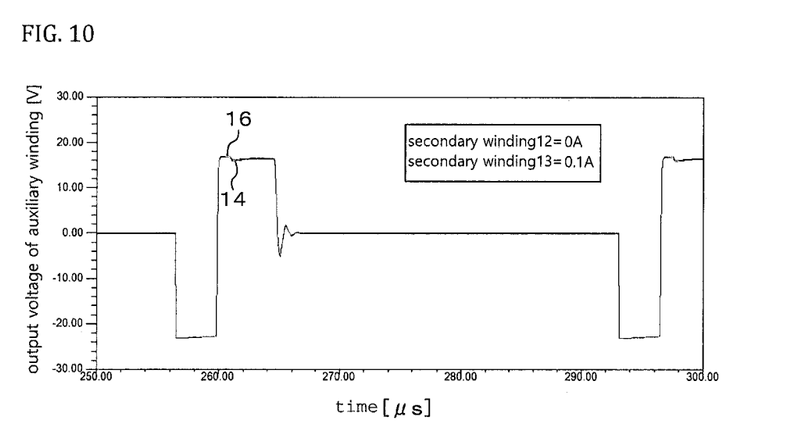
FIG. 10 is a graph showing a voltage of each of auxiliary windings of the second embodiment of the transformer in the elapsed time.

On the other hand, in the embodiment, the two auxiliary windings 14, 16 are provided in the core 10 and connected in parallel to each other. Accordingly, the auxiliary windings 14, 16 is shorted to each other, and the waveforms of the auxiliary windings 14, 16 are equalized. For example, FIG. 10 shows the voltage waveforms of the auxiliary windings 14, 16 in a case where the current of the secondary winding is 0 A and the current of the secondary winding 13 is 0.1 A. It can be seen that the two voltage waveforms are made same. Furthermore, since the auxiliary winding 14 neighbors the secondary winding 13 and the auxiliary winding 16 neighbors the secondary winding 12, the magnetic field generated by each of the auxiliary winding 14, 16 respectively exerts its action on each of the secondary windings 13, 12 which neighbors each of the auxiliary windings 14, 16.

Figure 11:
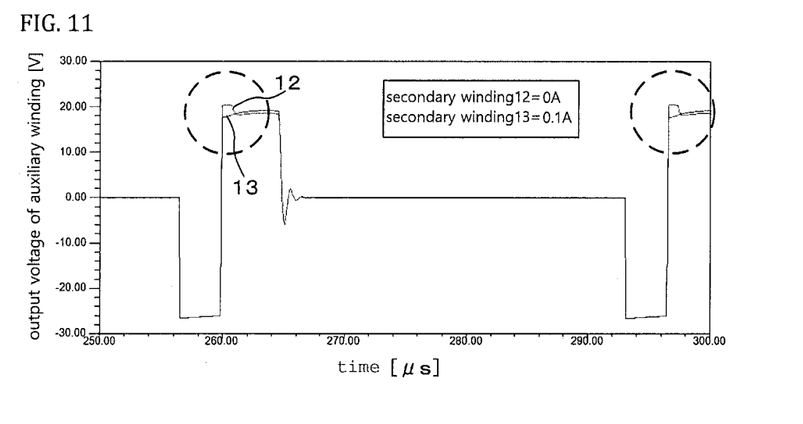
FIG. 11 shows a voltage waveform (before rectification) in a case where a current flowing through a secondary winding 12 is 0 A and a current flowing through a secondary winding 13 is 0.1 A.

In other words, when the load becomes unbalanced, the voltage waveform of one of the secondary windings 12, 13 is normal and the distortion occurs in the voltage waveform of the other of the secondary windings 12, 13. Along with this, due to the distorted voltage waveform of the secondary winding 12, 13 the voltage waveform of the auxiliary winding 14, 16 neighboring the secondary winding 12, 13 having the distorted voltage waveform also becomes distorted. However, the voltage waveform of the auxiliary winding 14, 16 which neighbors the secondary winding 12, 13 having the normal voltage waveform is normal, and the two auxiliary windings 14, 16 are shorted to each other. As a result, the voltage waveform of the auxiliary winding 14 16 which neighbors the secondary winding 12, 14 having the distorted voltage waveform is normalized. The auxiliary windings 14, 16 having the normalized voltage waveform exerts its action on the secondary winding 12, 13 having the distorted voltage waveform, thereby rendering the distorted voltage waveform normal. As such, the distortion is alleviated. In one example, FIG. 11 shows the voltage waveform (before rectification) in a case where the current of the secondary winding 12 is 0 A and the current of the secondary winding 13 is 0.1 A. As shown by the circular dotted line in FIG. 11, the projection (about 20V) in the voltage waveform of the secondary winding 12 (FIG. 11) is further lowered in comparison to the projection (about 21V) in the voltage waveform of the secondary winding 12 as shown in FIG. 8A. Therefore, it can be seen that the distortion is alleviated. As described above, the voltage waveforms of the secondary windings 12, 13 (before rectification) are improved such that they are equalized, the cross regulation can be reduced.

(2) In the embodiment, the secondary windings 12, 13 are arranged at both sides of the primary winding 11 and closer to the primary winding 11 than the auxiliary windings 14, 16, in the winding axis direction. Due to this, the coupling coefficient between each of the secondary windings 12, 13 and the primary winding 11 can be increased, thereby improving the transformation (conversion) efficiency of the transformer.

[3. Other Embodiments]

The invention is not limited to above embodiments, and also encompasses other embodiments described below. Furthermore, by properly combining a plurality of elements described in the above embodiments and other embodiments described below, various modification can be made. During the implementation of the invention, the element can be modified and embodied without departing from the scope of the invention. For example, one or more element may be removed, modified or replaced in the configuration of the embodiments. An exemplary other embodiments are provided below. Furthermore, the switched-mode power supply apparatus using the transformer in accordance with the above embodiments, or the other embodiments described below and the transformer obtained by combining the above embodiment and the other embodiment described below are also included in the scope of the invention.

Figure 12:
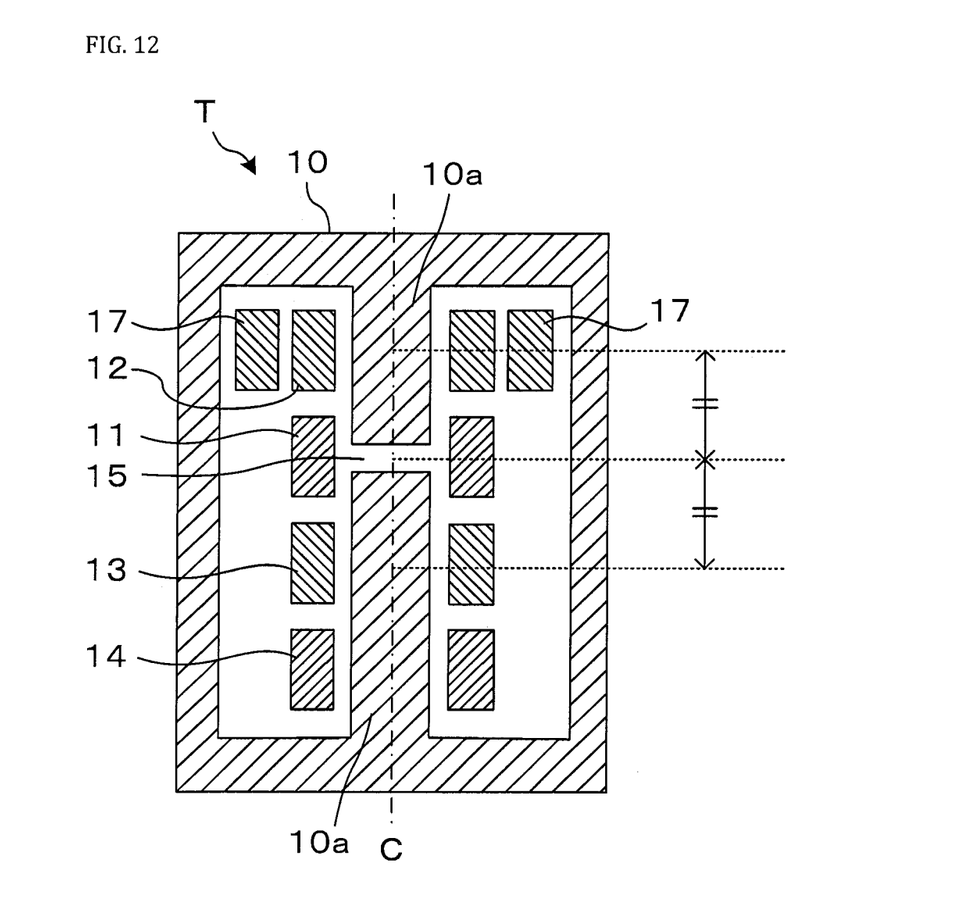
FIG. 12 is a schematic cross-sectional view showing an entire configuration of another embodiment of a transformer.

(1) While the two secondary windings 12, 13 are provided in the first and second embodiments, three or more secondary windings may be provided. In a case where odd numbers (for example, three) of secondary windings are adopted, the two of the secondary windings 12, 13 are symmetrically arranged with respect to the gap 15, and other secondary winding 17 is disposed over either of the secondary windings 12, 13, as shown in FIG. 12. In other word, the secondary winding 17 is provided outside either of the secondary windings 12, 13 such that it is wound around the same winding axis as either of the secondary windings 12, 13 and has a radius that is different from the radius of the either of the secondary windings 12, 13. In this case, the windings are insulated from each other by the resin bobbin and the like.

In a case where the even numbers of the secondary windings are adopted, they are spaced apart from the gap at an equal distance. If four secondary windings are provided, two of the secondary windings are respectively disposed over other two secondary windings, as described previously in connection with the case where odd numbers of secondary windings are adopted. As such, even in the case of multi-output form where three or more secondary windings are adopted, the secondary windings are symmetrically arranged with respect to the gap 15 and spaced apart from the primary winding 11 at an equal distance, thereby equalizing the inductance value and the coupling coefficient with respect to the primary winding 11. For the above reasons, the switched-mode power supply apparatus being capable of suppressing the difference between the output voltage values even in multi-output form can be obtained.

Figure 13:
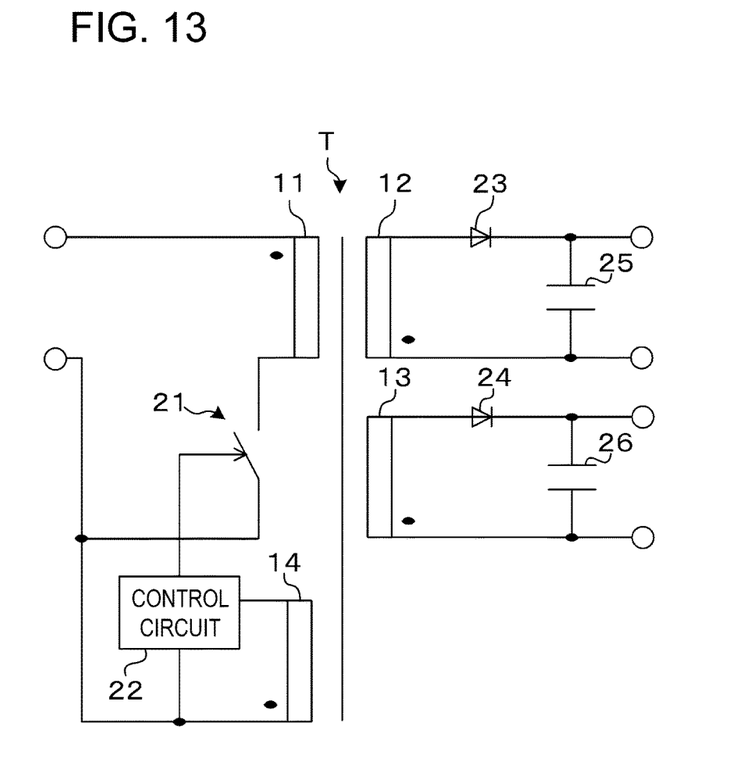
FIG. 13 is a circuit diagram of a switched-mode power supply apparatus provided with another embodiment of the transformer.

(2) While in the first and second embodiments the auxiliary windings 14, 16 and control circuit 22 are insulated from the primary winding 11, they may be connected to the primary winding 11, as shown in FIG. 13. Referring to FIG. 13 in connection with the control of the switching element 21, the control circuit 22 has a resistance for dividing the voltage of the auxiliary winding 14, voltage monitoring means for detecting the divided voltage, and IC. The IC calculates the output voltage of the secondary windings 12, 13 based on an input divided voltage value, a ratio of divided voltage, and winding number ratio of the auxiliary winding 14 and the secondary windings 12, 13. The IC generates the control signal such that a predetermined voltage is obtained, and outputs the control signal at the switching element 21.

(3) While in the second embodiment, two auxiliary windings 14, 16 are wound around the same winding axis as the windings 11-13 and arranged more away from the primary winding 11 than the secondary windings 12, 13, the above configuration can be reversed. In other words, the auxiliary windings 14, 16 are respectively disposed at both sides of the primary winding 11 and the secondary windings 12, 13 are respectively disposed outside the auxiliary windings 14, 16, in the winding axis direction.

(4) While in the first and second embodiments, the auxiliary winding 14, 16 are arranged on the same line in the winding axis direction of the primary winding 11 such that they do not overlap the secondary windings 12, 13, they may be arranged over and adjacent to the secondary windings 12, 13 such that it has a radius which is different from that of the secondary windings 12, 13 with respect to the winding axis as a center. For example, the auxiliary winding 14 may be arranged outside the secondary winding 13, and the auxiliary winding 16 may be arranged outside the secondary winding 12.

(5) While in the second embodiment, the auxiliary windings 14, 16 are spaced apart from the gap 15 at an equal distance and symmetrically arranged with respect to the gap 15, the invention is not limited thereto. In other words, even in a case where the auxiliary windings 14, 16 are not spaced apart from the gap 15 in an equal distance and not symmetrically arranged with respect to the gap 15, it would be enough that they can evenly exert their action on the secondary windings 12, 13. Furthermore, the auxiliary windings 14, 16 may be arranged closer to the primary winding 11 than the secondary windings 12, 13 in the winding axis direction.

(6) While in the second embodiment two auxiliary winding 14, 16 are provided, three or more auxiliary windings may be provided. For example, in a case where three or more secondary windings are provided, the auxiliary windings may be respectively arranged adjacent to each of the secondary windings, and connected in parallel to each other.

REFERENCE NUMERAL LIST 10 core
10a center leg portion
11 primary winding
12, 13, 17 secondary winding
14, 16 auxiliary winding
15 gap
21 switching element
22 control circuit
23, 24 diode (i.e., rectifying means)
25, 26 capacitor (i.e., smoothing means)
T transformer
C line shared by the winding axis of the primary winding and the winding axis of the secondary winding

The invention claimed is:

1. A transformer, comprising:

a core having a linear center leg portion in a center portion thereof;

a primary winding that is provided around the linear center leg portion of the core and is configured to be electrically connected to an external power source, wherein the primary winding creates a varying flux in the core in response to an input voltage applied from the external power source;

at least two secondary windings provided around the linear center leg portion of the core and having a winding axis which is the same as a winding axis of the primary winding, wherein each of the at least two secondary windings is configured to induce a voltage in response to the created varying flux in the core in order to provide the induced voltage to a load; and at least two auxiliary windings provided around the linear center leg portion of the core and having a winding axis which is the same as the winding axis of the primary winding, the auxiliary windings respectively neighboring the secondary windings, wherein each of the at least two auxiliary windings is configured to induce a voltage in response to the created varying flux in the core, the auxiliary windings being connected with each other in a parallel electric connection, wherein the auxiliary windings are electrically connected with a control circuit for controlling a switching element which is electrically connected with the primary winding and the auxiliary windings provide the control circuit with the induced voltage for driving the switching element, and wherein the secondary windings are disposed at both sides of the primary winding in a winding axis direction of the primary winding and are disposed closer to the primary winding than the auxiliary windings, in the winding axis direction of the primary winding.

2. The transformer in accordance with claim 1, further comprising a gap provided in the core at a location where the primary winding is provided, wherein the secondary windings are spaced apart from both sides of the primary winding at an equal distance in the winding axis direction of the primary winding; and are spaced apart from a gap of the linear center leg portion of the core at an equal distance in the winding axis direction of the primary winding.

3. A switched-mode power supply apparatus, comprising: the transformer in accordance with claim 1.

4. A switched-mode power supply apparatus, comprising: the transformer in accordance with claim 2.

5. The transformer in accordance with claim 1, wherein the auxiliary windings respectively neighbor the secondary windings in the winding axis direction of the primary winding.

6. The transformer in accordance with claim 1, wherein the control circuit controls the switching element in order to provide the input voltage to the primary winding.

7. The transformer in accordance with claim 1, wherein the auxiliary windings are provided electrically independent from the secondary windings.

* * * * *